United States Patent [19]

Hashimoto et al.

[11] Patent Number: 5,419,973
[45] Date of Patent: May 30, 1995

[54] COMPOSITE ROLL FOR ROLLING AND PROCESS FOR PRODUCING THE SAME

[75] Inventors: Mitsuo Hashimoto; Seiji Otomo; Masatoshi Ayagaki; Kenzo Sawada, all of Kitakyushu; Shigeru Uchida, Futtsu, all of Japan

[73] Assignee: Nippon Steel Corporation, Tokyo, Japan

[21] Appl. No.: 989,241

[22] PCT Filed: Jun. 13, 1991

[86] PCT No.: PCT/JP91/00798

§ 371 Date: Dec. 11, 1992

§ 102(e) Date: Dec. 11, 1992

[87] PCT Pub. No.: WO91/19824

PCT Pub. Date: Dec. 26, 1991

[30] Foreign Application Priority Data

Jun. 13, 1990 [JP] Japan ................. 2-152576
Jun. 13, 1990 [JP] Japan ................. 2-152577
Nov. 13, 1990 [JP] Japan ................. 2-306458

[51] Int. Cl.$^6$ .............. B22D 19/16; B22D 27/04; C22C 38/24; B21B 27/00
[52] U.S. Cl. ................... 428/683; 428/685; 492/3; 492/54; 29/895.32
[58] Field of Search ............. 492/54, 58, 3; 29/895.3, 895.32; 428/681, 682, 683, 684, 685; 164/98

[56] References Cited

U.S. PATENT DOCUMENTS

| | | | |
|---|---|---|---|
| 4,433,032 | 2/1984 | Nakamura et al. | 428/682 |
| 4,436,791 | 3/1984 | Bocquet et al. | 428/682 |
| 4,548,653 | 10/1985 | Bocquet et al. | 148/3 |
| 4,596,282 | 6/1986 | Maddy et al. | 164/76.1 |
| 4,721,153 | 1/1988 | Sano et al. | 29/895.32 |
| 4,726,417 | 2/1988 | Sano | 492/54 |
| 4,958,422 | 9/1990 | Oshima | 492/54 |
| 5,225,007 | 7/1993 | Hattori et al. | 29/895.3 |
| 5,305,522 | 4/1994 | Nawata et al. | 492/54 |

FOREIGN PATENT DOCUMENTS

| | | | |
|---|---|---|---|
| 0051511 | 5/1982 | European Pat. Off. | |
| 0309587 | 4/1989 | European Pat. Off. | |
| 347512 | 12/1989 | European Pat. Off. | 492/3 |
| 0430241 | 6/1991 | European Pat. Off. | |
| 44-4903B | 2/1969 | Japan . | |
| 57-106464A | 7/1982 | Japan . | |
| 58-87249A | 5/1983 | Japan . | |
| 58-144455 | 8/1983 | Japan | 492/54 |
| 59-153869 | 9/1984 | Japan | 492/54 |
| 60-124407 | 7/1985 | Japan | 492/54 |
| 61-60256A | 3/1986 | Japan . | |
| 61-199051 | 9/1986 | Japan . | |
| 63-114937 | 5/1988 | Japan . | |
| 63-266043 | 11/1988 | Japan . | |
| 1-91901 | 4/1989 | Japan | 492/54 |

OTHER PUBLICATIONS

Tekko Zairyo no Mamo, Wear of Steel Material, Feb., 1984, p. 16.

*Primary Examiner*—John Zimmerman
*Attorney, Agent, or Firm*—Kenyon & Kenyon

[57] ABSTRACT

A composite roll for hot rolling wherein the outer layer portion of a composite roll comprises a steel comprised of, in terms of % by weight, 1.5 to 2.4% of C, 3 to 6% of V and 10 to 20% of at least one element selected from the group consisting of Cr, Mo and W and optionally at least one element of 0.05 to 0.20% of Al and 0.02 to 0.10% of Ti as an inoculation material, with the balance comprising Fe and unavoidable impurities, the outer layer portion comprising a metallic structure which has a crystal grain diameter of 30 to 150 μm and is surrounded by a eutectic carbide crystallized in the grain boundary or a metallic structure wherein a primary crystallized carbide is further dispersed and crystallized in a matrix structure of the crystal. It is excellent particularly in the surface roughening resistance.

8 Claims, 7 Drawing Sheets

COMPOSITE ROLL FOR ROLLING AND PROCESS FOR PRODUCING THE SAME

TECHNICAL FIELD

The present invention relates to a composite roll for rolling comprising a solid phase core material and an outer layer material formed by casting around the core material, and a process for producing the same.

BACKGROUND ART

A high alloy chromium cast iron having suitable wear resistance and cracking resistance and comprising 2 to 3.2% of C, 12 to 18% of Cr, 2% or less of Ni and 2% or less of Mo or a high alloy grain cast iron comprising 3 to 3.4% of C, 0.4 to 1.5% of Cr, 2 to 5% of Ni and 0.2 to 1.0% of Mo has hitherto been used as a roll for hot rolling (see "Tekko Zairyo no Mamo (Wear of Steel Material)", Joint Society on Iron and Steel Basic Research, page 16 (1984)). Further, Japanese Unexamined Patent Publication (Kokai) No. 58-87249 has proposed a wear-resistant cast iron roll material comprising 2.4 to 3.5% of C, 6.1 to 14% of V and alloying elements, that are Cr, Mo, W and Co, for improving the wear resistance.

With respect to a technique for producing this type of roll, as disclosed in, for example, Japanese Examined Patent Publication (Kokoku) No. 59-19786 and Japanese Unexamined Patent Publication (Kokai) No. 61-60256, a technique is known wherein a cooling die is provided around a core material preheated by means of a preheating coil, introducing a molten metal into the cooling die while heating the molten metal by means of a heating coil to form an outer layer welded to around the core material.

Wear resistance and crack resistance are important to properties required of the rolling roll of the type described above. Smaller wear contributes to an improvement in the accuracy of sheet thickness of the rolled product and, at the same time, reduces the frequency of replacement of rolls, which in turn contributes to an improvement in the working efficiency.

When the crack resistance is insufficient, cracking occurs due to the application of thermal or mechanical load during use, which gives rise to a major problem trouble. Therefore, it is strongly desired for the rolling roll to have both the wear resistance and the crack resistance.

In this connection, as compared with the conventional high chromium cast iron and high alloy grain cast iron, a wear-resistant material proposed in Japanese Unexamined Patent Publication (Kokai) No. 58-87249 has been confirmed to have better wear resistance. In this material as well, it is necessary to further improve the crack resistance.

Surface roughening resistance and roll surface roughness are other properties required of the rolling roll. Specifically, the smaller the surface roughness of the roll applied to the rolling, the better the appearance of a product formed by rolling through the use of such a roll. For this reason, an improvement in the surface roughening resistance through a reduction in the surface roughness of the roll has been strongly desired in the art.

DISCLOSURE OF THE INVENTION

In view of the above-described problems of the prior art, an object of the present invention is to provide a process for producing a composite roll for hot rolling which is excellent in wear resistance and crack resistance, particularly surface roughening resistance.

Another object of the present invention is to provide a process for the formation of a composite roll which comprises cladding the periphery of a core material with an outer layer material.

The present inventors have made extensive and intensive studies with a view to attaining the above-described object and, as a result, have found that in order to improve the above-described properties in the composite roll, it is necessary to use a steel having particular constituents and crystal structure and that in the process for the formation of a composite roll, it is important to specify cooling conditions (optionally induction heating conditions) of a molten metal, which has led to the completion of the present invention.

Specifically, the subject matter of the present invention resides in a composite roll wherein the outer layer portion of a composite roll comprises a steel comprised of, in terms of % by weight, 1.5 to 2.4% of C, 3 to 6% of V and 10 to 22% of at least one element selected from Cr, Mo and W and optionally at least of 0.05 to 0.20% of Al and 0.02 to 0.10% of Ti as an inoculation material with the balance consisting of Fe and unavoidable impurities, said outer layer portion comprising a metallic structure which has a crystal grain diameter of 30 to 150 $\mu$m and is surrounded by an eutectic carbide crystallized in the grain boundary or a metallic structure wherein a carbide as a primary crystal is further dispersed and crystallized in a matrix structure of said crystal.

According to another aspect of the present invention, there is provided a process for producing a composite roll, comprising pouring a molten metal comprising the above-described steel constituents in between a refractory frame and a core material, conducting induction heating, cooling and solidifying the poured molten metal by means of a water-cooled mold provided at the lower end of said refractory frame at an average solidification rate of 4 to 50 mm/min to form an outer layer portion and gradually pulling out the peripheral portion integrated with the core material.

In the composite roll produced according to the present invention, the outer layer portion has a structure wherein a hard $M_6C$ carbide (particularly (Cr, Mo, W)$_6$C carbide) is crystallized in the grain boundary of a matrix structure (an austenite structure) of a fine crystal grain or a very dense structure wherein a harder MC carbide (particularly VC carbide) is dispersed within the matrix structure of the outer layer portion, and the matrix structure is hardened by the heat treatment (hardening and tempering) of the roll, so that it is possible to provide a roll having a surface roughening resistance and a wear resistance superior to those of the conventional roll for hot rolling.

BEST MODE FOR CARRYING OUT THE INVENTION

The best mode for carrying out the invention will now be described in detail.

At the outset, the constituents of the outer layer portion of the roll according to the present invention will be described.

The reason why the C content is limited to 1.5 to 2.4% is as follows. When the C content is less than the lower limit value, the degree of crystallization of a hard carbide is so small that the wear resistance is remarkably deteriorated, which makes it impossible to improve the wear resistance. On the other hand, when the C content exceeds the upper limit value, the amount of fragile carbide increases. This causes the crack resistance to be spoiled and the toughness to be lowered, so that the object of the present invention cannot be attained.

In general, it is considered that when the C content is enhanced, the amount of the hard carbide is increased, which contributes to an improvement in the wear resistance. In the present invention, however, since the material of the present invention contains a large amount of alloyed elements, the morphology and amount of the carbide vary. The present inventors have found that the optimum C content for providing both the surface roughening resistance and the wear resistance is in the range of from 1.5 to 2.4%.

In this respect, the C content of a material proposed in Japanese Unexamined Patent Publication (Kokai) No. 58-87249 is so high that the wear resistance unfavorably lowers.

The V content is selected by taking the balance between the V content and the C content into consideration because V causes a MC carbide (VC in the present invention) having a hardness much larger than that of carbides based on a cementite carbide (FeC) or a chromium carbide ($Cr_7C_3$) to be crystallized. In particular, in the present invention, the VC carbide is directly crystallized as a primary crystal carbide from molten metal and a most important factor for regulating the structure.

Specifically, even though the C content is in the range of from 1.5 to 2.4%, if the V content is less than the lower limit value, that is, less than 3%, a hard VC-based carbide does not crystallize and unfavorably comes into a matrix structure.

On the other hand, when the C content is 6% or more, since the VC carbide crystallizes as a primary crystal, the amount of the carbide is increased, so that the surface roughening resistance is deteriorated. Further, since the specific gravity of the VC carbide is much smaller than that of the molten metal, the distribution is biased, so that no homogeneous material is produced. For this reason, the V content should fall within the above-described range.

All the allowed elements, that is, Cr, Mo and W, combine mainly with C to form an eutectic carbide. In the present invention, the eutectic carbide is a very hard $M_6C$ carbide. Therefore, this carbide can impart a combination of the wear resistance with the toughness to the material. In order to regulate the amount of the carbide formed, the content of at least one element of the above-described three elements should be limited to 10 to 22%.

When the lower limit value is 10% or less, the amount of the hard carbide is so small that the wear resistance becomes insufficient.

On the other hand, when the upper limit value exceeds 22%, the amount of the carbide becomes so large that the surface roughening resistance is spoiled. For this reason, in order for the material to have a combination of the surface roughening resistance with the wear resistance, the content should fall within the above-described range.

Part of Cr and Mo is distributed in the matrix structure to increase the hardenability and, at the same time, to have a function of conducting precipitation hardening particularly at a high temperature.

When an oxide forming element, such as Al or Ti, is inoculated into the molten metal during the roll casting, an oxide, for example, $Al_2O_3$ or $Ti_2O_3$, is formed in the molten metal. This oxide serves as a nucleus, and a VC carbide crystallizes around the nucleus. Therefore, the oxide forming element is important to the dispersion and crystallization of the VC carbide. At least one of Al and Ti should be added in an amount of 0.05 to 0.20% for Al and 0.02 to 0.10% for Ti.

Besides the above-described ingredients, Si and Mn which are elements useful in a dissolution technique each may be incorporated in an amount of about 0.3 to 1.5% for the purpose of conducting deoxidation of the molten metal.

Further, impurities such as P and S as well may be contained so far as the content is one found in the case of the conventional casting, that is, about 0.03% or less. These do not spoil the effect of the present invention.

Ni is detrimental to the surface roughening resistance in this type of roll, so that the Ni content is desirably 1% or less.

In the present invention, Co contributes to an improvement in the high-temperature strength and the high-temperature hardness of the matrix within the metallic structure, and the addition of Co in an amount of 0.1 to 10%, preferably 5 to 10%, contributes to a further improvement in the surface roughening resistance and the wear resistance of the roll.

A description will now be given of a densely solidified structure which is particularly excellent in the surface roughening resistance.

In the conventional hot rolling, since the surface of the roll becomes a high temperature of 600° to 800° C., the matrix structure is tempered and softened. For this reason, in commonly used cast-iron-based rolls comprising a high chromium cast iron, a high alloy grain cast iron or the like, the matrix structure is worn preferentially over the stable carbide even at a high temperature, so that the surface of the roll becomes uneven, which gives rise to surface roughening. Refinement of the matrix structure and crystallization and dispersion of a large amount of a hard carbide in the crystal grain boundary and within the crystal grain are important to the prevention of the surface roughening.

The present inventors have confirmed that when the surface roughness, Ra (μm), of the roll after use is in the range of from 1.6 to 0.3 μm, the surface roughening of the roll can be prevented and, at the same time, the occurrence of slippage between the roll and the rolled product can be inhibited.

Further, they have found that in order to obtain the surface roughness falling within the above-described range, it is necessary for the crystal grain diameter of the roll structure to be in the range of from 30 to 150 μm.

Figure 1:
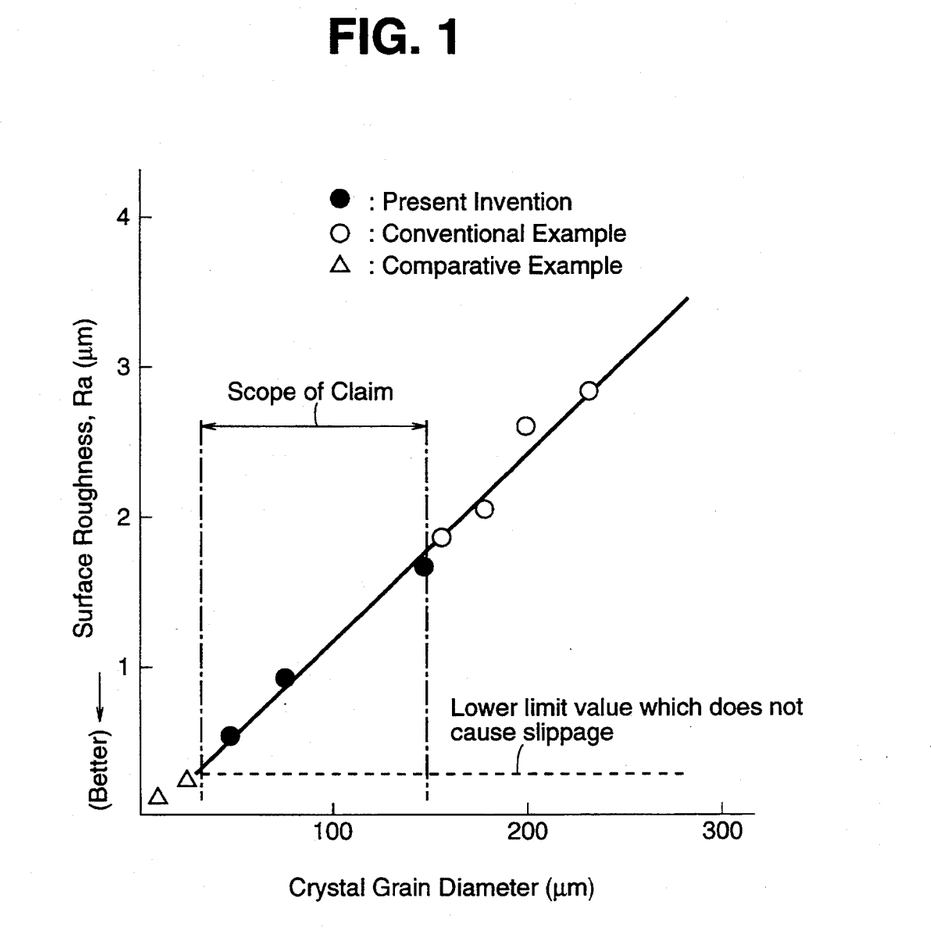
FIG. 1 is a diagram showing the relationship between the crystal grain diameter and the surface roughness after use of the roll.

This is shown in FIG. 1. In FIG. 1, the ordinate represents the surface roughness, Ra (μm), and the abscissa represents the crystal grain diameter (μm). The range of the surface roughness contemplated in the present invention is one defined by the mark ● in the drawing. This drawing indicates that the crystal grain diameter necessary for attaining this surface roughness is in the range of from 30 to 150 μm.

In order to always maintain such a surface roughness, it is necessary to impart the wear resistance and toughness to the roll. For this reason, in the present invention, a hard $M_6C$ carbide is crystallized as a eutectic crystal in the crystal grain boundary. Further, a very hard MC carbide is crystallized as a primary crystal within a crystal grain of the matrix structure for the purpose of forming a denser structure.

The process of the formation of the structure according to the present invention will now be described through an embodiment wherein the above-described oxide forming element is inoculated into the molten metal.

Figure 3:
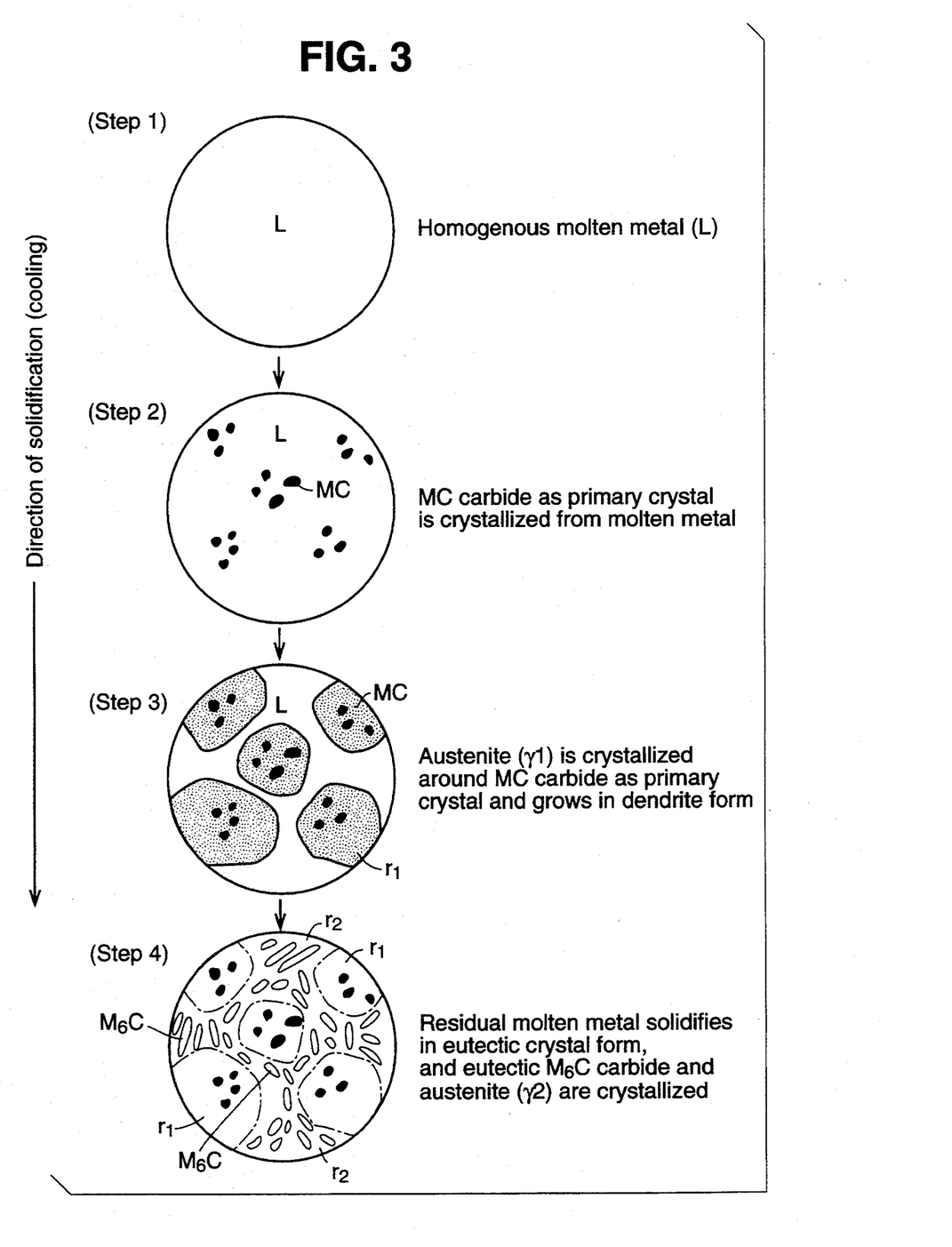
FIG. 3 is a diagram showing a change in the structure in the roll production process according to the present invention.

FIG. 3 is a diagram showing the process of advance of the solidification in the cooling of a molten metal. A molten metal (L) (step 1) comprising ingredients according to the present invention is cooled to disperse and crystallize a MC (VC) carbide as a primary crystal from the molten metal. The carbide is easily and surely crystallized with an oxide ($Al_2O_3$ or the like) formed in the molten metal serving as a nucleus (step 2).

When the molten metal is further cooled, an austenite ($\gamma_1$) is crystallized as a primary crystal around the MC carbide as the primary crystal and grows in a dendrite form (step 3).

Then, the residual molten metal (n) solidifies in a eutectic crystal form at an eutectic crystallization temperature, so that eutectic $M_6C$ ($(Cr, Mo, W)_6C$) carbides and a eutectic austenite ($\gamma_2$) crystallize (step 4)

As described above, in the present invention, the crystal grain diameter is in the range of from 30 to 150 μm. The crystal grain diameter is intended to mean a crystal grain diameter at the time of solidification, that is, as indicated in the step 4, the maximum diameter of a crystal grain surrounded by an eutectic $M_6C$ carbide crystallized in the crystal grain boundary. Therefore, the structure is such that a hard carbide is crystallized in the crystal grain boundary or within a fine crystal grain.

A process for producing the roll according to the present invention will now be described. The composite roll of the present invention is produced by using an apparatus shown in FIGS. 6 and 7.

Figure 6:
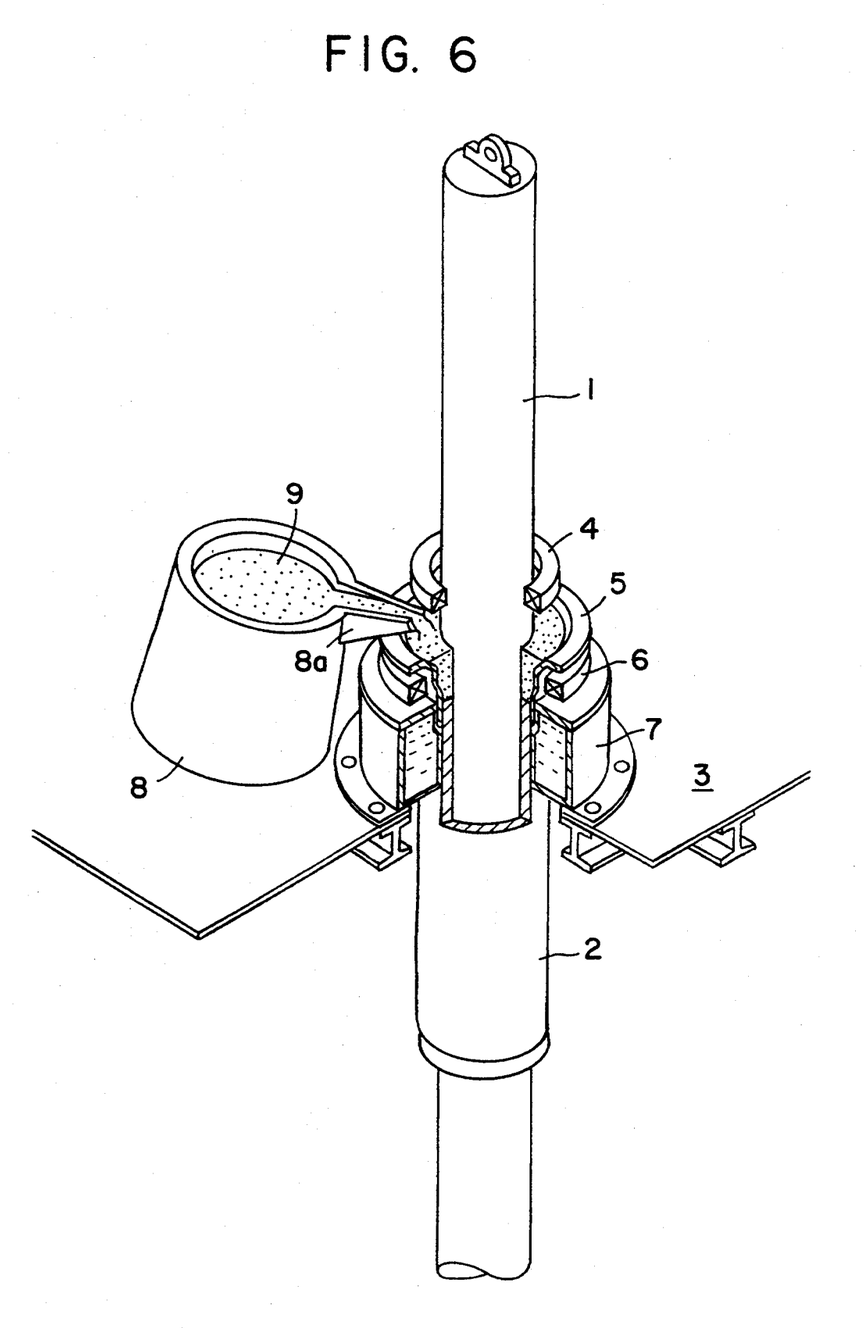
FIG. 6 is a partially cross-sectional diagonal view schematically showing an apparatus for practicing the process according to the present invention.
Figure 7:
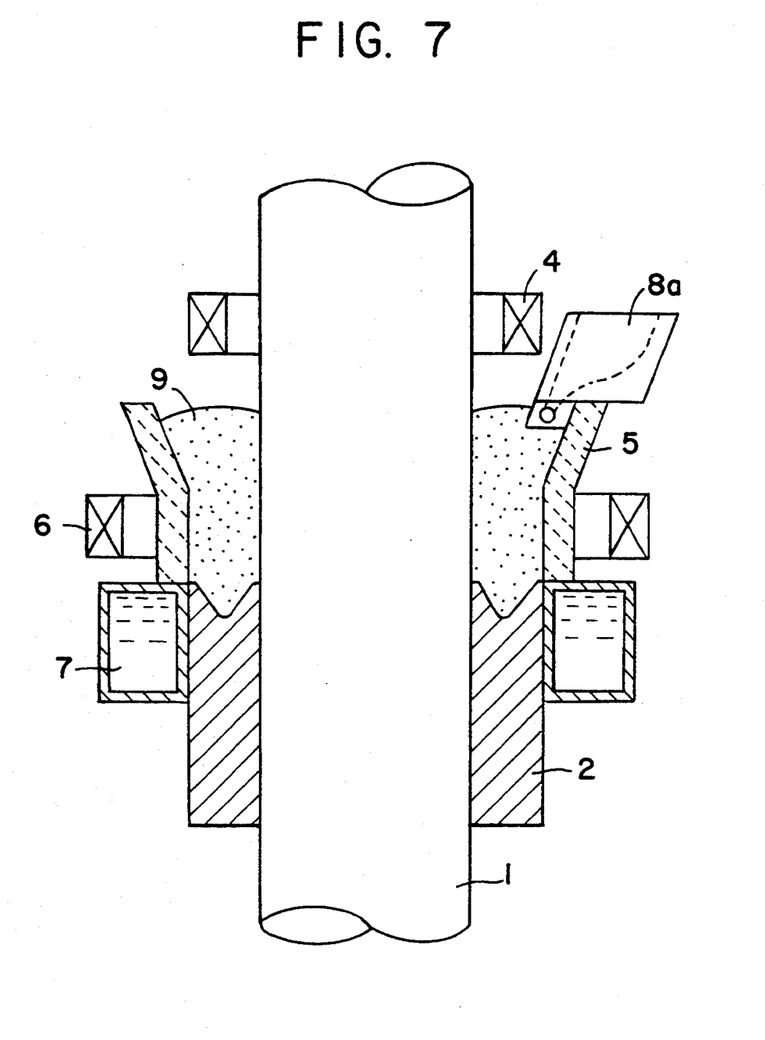
FIG. 7 is a schematic cross-section showing a principal part of the apparatus shown in FIG. 6.

As shown in these drawings, a core material 1 in a rod form comprising an alloy steel, such as SCM440, is provided in such a manner that it can be vertically moved. A preheating coil 4, a refractory frame 5, an induction heating coil 6 and a water-cooled mold 7 are provided on a platform 3 having an opening through which the core material 1 has been inserted and passed in such a manner that they are coaxially provided in that order from the top about the core material 1. The core material 1 is supported by means (not shown) so that it can be moved downward at a constant low speed. In the apparatus, at the outset, the core material 1 is heated by means of the preheating coil 4. A molten metal 9 comprising a high speed steel or the like reservoired in a ladle 8 is introduced through a nozzle 8a into an annular space defined by the outer periphery of the preheated core material 1 and the refractory frame 5. The heating coil 6 is provided around the refractory frame 5, and the molten metal 9 within the refractory frame 5 is heated by the heating coil 6. The lower end of the refractory frame 5 is in contact with the water cooling mold 7, and the molten metal introduced into between the water-cooled mold 7 and the core material 1 is gradually solidified to form an outer layer 2.

Heating of the molten metal by means of the induction heating coil 6 and cooling by means of the water-cooled mold 7 are most important to the production of a composite roll by using the above-described apparatus. Specifically, the above-described heating is important to welding of the outer periphery of the core material 1 to the outer layer portion 2, and the above-described cooling is important to the formation of a structure having a crystal grain diameter of 30 to 150 μm.

The size of the structure, that is, the crystal grain diameter, is determined by the solidification rate. Therefore, when refinement of the structure through a reduction in the crystal grain diameter is intended, it is necessary to increase the solidification rate. In the centrifugal casting which is the most common production process in the art, however, there is a limitation on the crystal grain diameter due to the reliance upon the removal of heat of the mold. Further, in this case, the size of the roll has an effect on the crystal grain diameter. For this reason, the crystal grain diameter is about 200 μm at the smallest in the case of a roll for hot roll finishing.

By contrast, in the continuous casting process used in the present invention, since it is possible to positively conduct cooling with water through a water-cooled mold, the solidification rate can be increased. Specifically, a crystal grain diameter of 30 to 150 μm corresponding to a roll surface roughness, Ra, of 0.3 to 1.5 μm can be attained by pulling out the core material integrated with the outer layer at a rate of 4 to 50 mm/min.

Figure 2:
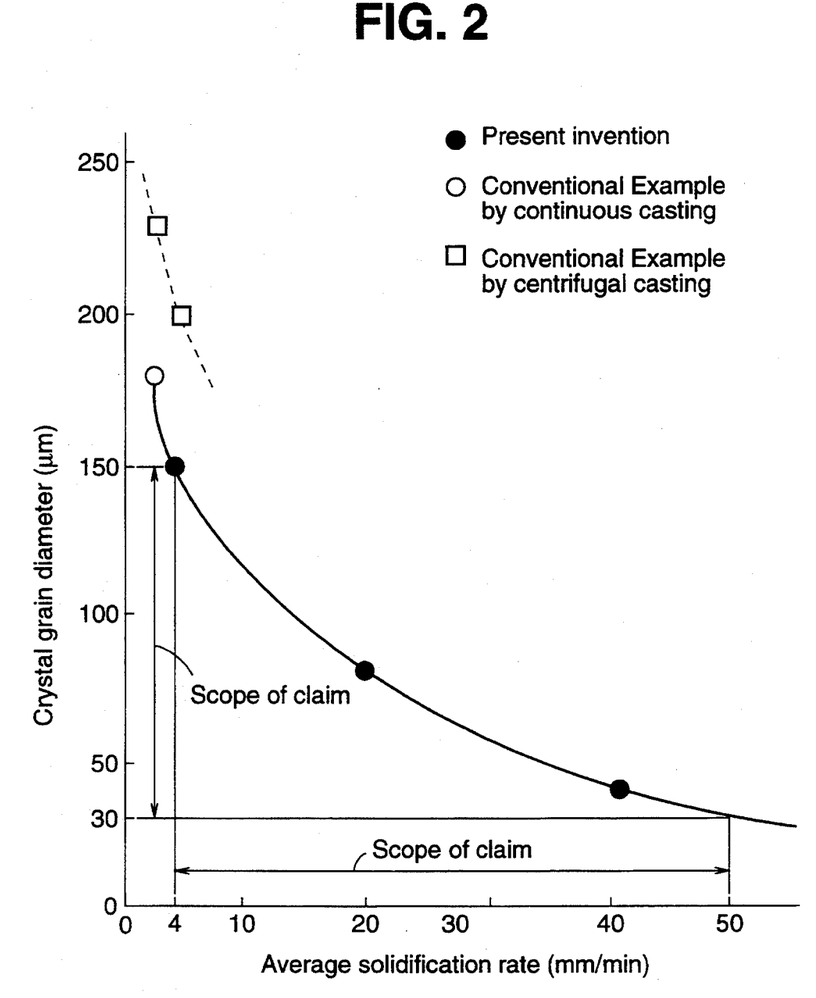
FIG. 2 is a diagram showing the relationship between the average solidification rate and the crystal grain diameter.

FIG. 2 is a graph showing the relationship between the crystal grain diameter (μm) (ordinate) and the average solidification rate (mm/min) (abscissa) in Example 2. It suggests that in order to attain a crystal grain diameter of 30 to 150 μm, it is necessary for the solidification rated to be 4 to 50 mm/min.

Figure 4:
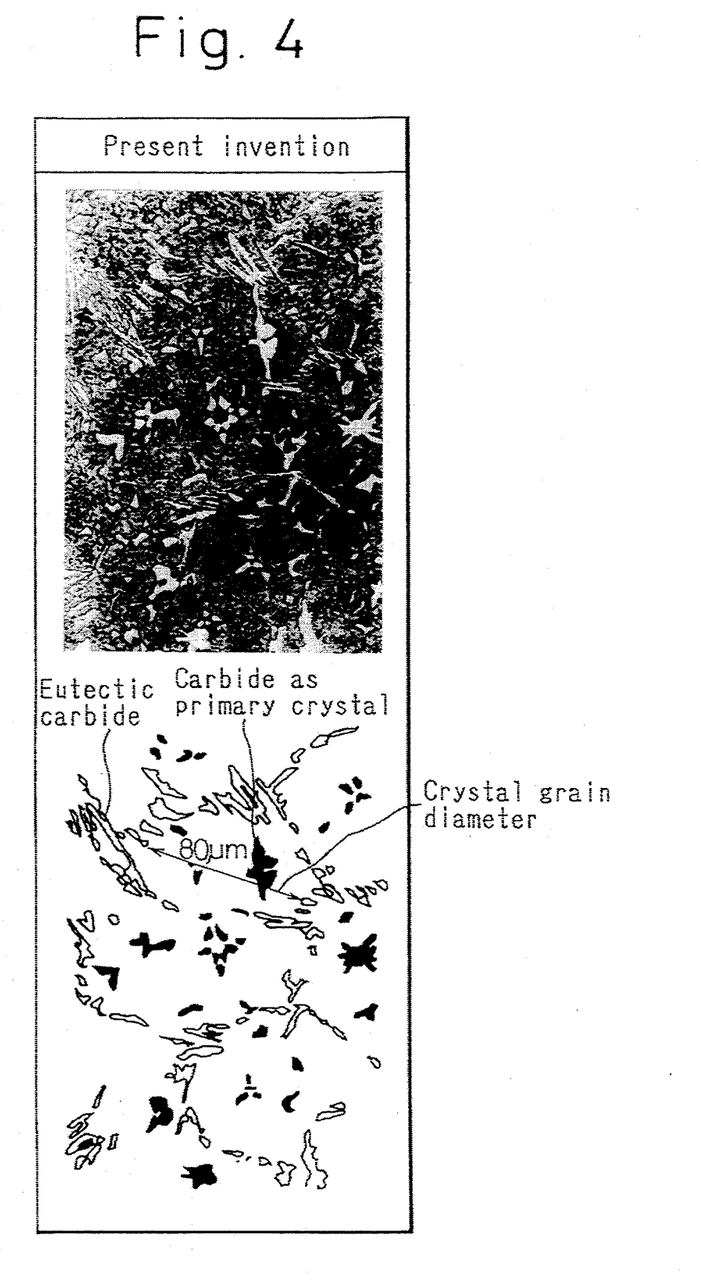
FIG. 4 is a microphotograph showing the structure of the roll according to the present invention and an explanatory diagram for the microphotograph.

FIG. 4 is a microphotograph of the outer layer portion of a roll produced by a casting process through the use of the above-described casting equipment wherein the molten metal is composed mainly of 2.13% of C, 5.13% of Cr, 6.48% of Mo, 5.31% of V, 4.12% of W and 0.10% of Al and casting is conducted at a solidification rate of 20 mm/min. As is apparent from the microphotograph and an explanatory diagram for the microphotograph, in the structure according to the present invention, the periphery of the crystal grain having a diameter of 80 μm is surrounded by an eutectic carbide, and a carbide as a primary crystal is scatteringly present within the matrix.

Figure 5:
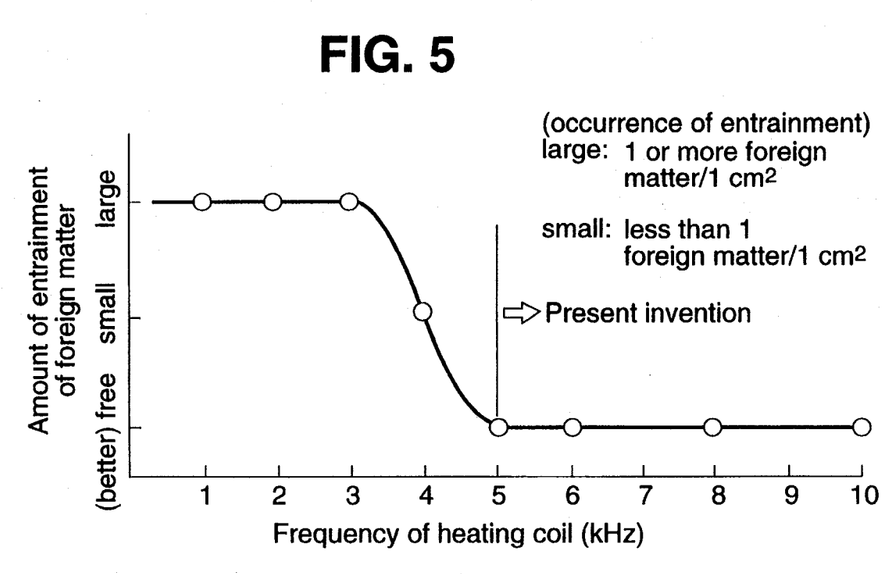
FIG. 5 is a diagram showing the relationship between the frequency of a heating coil and the state of entrainment of foreign matter.

When the solidification rate is increased for the purpose of reducing the crystal grain diameter, the welding between the outer layer and the core material is often deteriorated. For this reason, as described above, it is necessary to supply heat by means of an induction heating coil for the purpose of attaining complete welding. In supplying heat through induction heating, the molten metal is unfavorably stirred. Therefore, with an increase of electric power for heating, stirring power increases, so that foreign matter on the surface of the molten metal, such as an oxide film material and slag, remains in the solidified boundary and consequently in the outer layer after solidification, which remarkably spoils the quality of the product. In order to prevent the occurrence of this phenomenon, it is necessary to increase the frequency for the purpose of suppressing the stirring power. As shown in FIG. 5, the occurrence of a defect caused by remaining foreign matter can be prevented when the frequency is 5 kHz or more.

The composite roll produced by continuous casting is subjected to a conventional hardening treatment. In this case, austenite crystallized during solidification becomes a hard martensite and is tempered to give a tempered martensite.

Thus, since the composite roll according to the present invention is hard and has a dense structure, it can be very advantageously used as a roll for hot rolling.

EXAMPLES

Example 1

Work rolls for hot roll finishing comprising chemical ingredients specified in the columns for Examples 1, 2 and 3 of the present invention in Table 1 were produced by continuous casting through the use of an apparatus shown in FIG. 6. The dissolution was conducted in a high frequency furnace, and steel forging (SCM440) was used as the core material. With respect to heat treatment, casting was followed by annealing, hardening and tempering.

TABLE 1

| | | Chemical Ingredients (%) | | | | | | | | Manufacturing quality | | | Service quality | |
|---|---|---|---|---|---|---|---|---|---|---|---|---|---|---|
| No. | Process | C | Si | Mn | Ni | Cr | Mo | V | W | kind of carbide | hardness (Hs) | crystal grain diameter ($\mu$m) | surface roughness (Ra) ($\mu$m) | slipping |
| Ex. of Present invention | | | | | | | | | | | | | | |
| 1 | continuous casting | 2.13 | 0.62 | 0.51 | 0.10 | 5.13 | 6.48 | 5.31 | 4.12 | MC + M$_6$C | 83.0 | 150 | 1.6 | free |
| 2 | continuous casting | 2.10 | 0.63 | 0.52 | 0.05 | 5.36 | 6.02 | 4.83 | 3.98 | MC + M$_6$C | 82.0 | 80 | 0.9 | free |
| 3 | continuous casting | 2.01 | 0.59 | 0.48 | 0.04 | 5.52 | 6.51 | 5.09 | 4.01 | MC + M$_6$C | 82.5 | 50 | 0.5 | free |
| Comp. Ex. | | | | | | | | | | | | | | |
| 1 | centrifugal casting | 3.30 | 0.73 | 0.90 | 4.42 | 1.62 | 0.44 | <0.01 | <0.01 | Fe$_3$C | 79.0 | 200 | 2.5 | free |
| 2 | centrifugal casting | 2.81 | 0.58 | 1.11 | 1.29 | 17.44 | 1.27 | 0.20 | <0.01 | M$_7$C$_3$ | 72.0 | 180 | 2.0 | free |
| 3 | forging | 2.09 | 0.67 | 0.53 | 0.15 | 5.39 | 4.13 | 5.02 | 0.58 | MC + M$_7$C$_3$ | 82.0 | 240 | 3.0 | free |
| 4 | powder metallurgy | 2.27 | 0.52 | 0.70 | 0.09 | 6.21 | 7.70 | 4.59 | 3.55 | MC | 82.5 | 25 | 0.2 | occurred |
| 5 | powder metallurgy | 2.35 | 0.53 | 0.63 | 1.31 | 16.02 | 1.31 | 0.18 | <0.01 | M$_7$C$_3$ | 73.0 | 5 | 0.1 | occurred |

The results of comparison of Examples 1 to 3 of the present invention with Comparative Examples 1 to 5 on specific manufacturing quality and service quality in an actual machine are given in Table 1. In Examples 1, 2 and 3 of the present invention, the crystal grain diameters were 150 $\mu$m, 80 $\mu$m, and 50 $\mu$m, respectively, and the surface roughnesses, Ra, after use were 1.6 $\mu$m, 0.9 $\mu$m and 0.5 $\mu$m respectively. That is, rolls having a very good quality could be produced. Further, no slippage between the roll and the rolled product occurred.

Example 2

Work rolls for hot roll finishing wherein the chemical ingredients of the outer layer portion and the core material are as specified in Examples 1 to 3 of Table 2 were produced by continuous casting through the use of an apparatus shown in FIG. 6. The manufacturing conditions, manufacturing quality and service quality are given in Table 2 together with those of Comparative Examples 1 to 5.

TABLE 2

| No. | Process | Classification | Chemical Ingredients (wt. %) | | | | | | | | | | |
|---|---|---|---|---|---|---|---|---|---|---|---|---|---|
| | | | C | Si | Mn | P | S | Ni | Cr | Mo | V | W | Co |
| Ex. of Present Invention | | | | | | | | | | | | | |
| 1 | Continuous casting | outer layer | 2.05 | 0.61 | 0.53 | 0.014 | 0.012 | 0.03 | 4.85 | 6.40 | 5.19 | 4.86 | 0.91 |
| | | core material | 0.42 | 0.25 | 0.75 | 0.015 | 0.007 | 0.13 | 1.04 | 0.17 | — | — | — |
| 2 | Continuous casting | outer layer | 2.00 | 0.58 | 0.51 | 0.015 | 0.011 | 0.04 | 4.93 | 6.38 | 5.08 | 4.66 | 7.81 |
| | | core material | 0.41 | 0.28 | 0.81 | 0.015 | 0.010 | 0.13 | 1.02 | 0.18 | — | — | — |
| 3 | Continuous casting | outer layer | 2.03 | 0.57 | 0.51 | 0.014 | 0.013 | 0.03 | 5.49 | 6.52 | 5.10 | 4.03 | 3.06 |
| | | core material | 0.39 | 0.26 | 0.77 | 0.014 | 0.012 | 0.14 | 1.05 | 0.17 | — | — | — |

TABLE 2-continued

| Comp. Ex. | | | | | | | | | | | | | |
|---|---|---|---|---|---|---|---|---|---|---|---|---|---|
| 1 | Centrifugal casting | outer layer | 3.28 | 0.82 | 0.90 | 0.015 | 0.012 | 4.41 | 1.68 | 0.46 | — | — | — |
| | | core material | 3.25 | 1.75 | 0.44 | 0.040 | 0.013 | 0.77 | 0.34 | 0.18 | — | — | Mg 0.052 |
| 2 | Centrifugal casting | outer layer | 2.85 | 0.59 | 1.09 | 0.018 | 0.011 | 1.26 | 17.69 | 1.09 | 0.20 | — | — |
| | | core material | 3.32 | 3.15 | 0.45 | 0.023 | 0.006 | 0.50 | 0.07 | 0.01 | — | — | Mg 0.043 |
| 3 | continuous casting | outer layer | 2.53 | 0.60 | 0.51 | 0.014 | 0.011 | 0.03 | 5.23 | 6.12 | 6.04 | 4.51 | — |
| | | core material | 0.40 | 0.26 | 0.79 | 0.014 | 0.008 | 0.12 | 1.05 | 0.18 | — | — | — |
| 4 | powder metallurgy | — | 2.27 | 0.52 | 0.70 | 0.020 | 0.014 | 0.09 | 6.21 | 7.70 | 4.59 | 3.55 | — |
| 5 | powder metallurgy | — | 2.35 | 0.53 | 0.63 | 0.018 | 0.015 | 1.31 | 16.02 | 1.31 | 0.18 | <0.01 | — |

| | Manufacturing | | | | Manufacturing quality | | | | Service quality | | | |
|---|---|---|---|---|---|---|---|---|---|---|---|---|
| No. | pouring temp. (°C.) | inoculation material | average solidification rate (mm/ min) | frequency of coil for heating molten metal (KHz) | kind of carbide | dispersion of MC carbide | crystal grain diameter (μm) | entrainment of foreign matter in product | hardness (Hs) | ton of rolling based on consumption of 1 mm (ratio) | average crack depth at the time of accident (ratio) | surface roughness (Ra) | slip between roll and sheet |
| Ex. of Present Invention | | | | | | | | | | | | | |
| 1 | 1570 | Al 0.1% | 4 | 5 | MC + M₆C | dispersed in matrix | 150 | free | 85.0 | 9255 Ton (5.30) | 0.6 mm/ time (0.50) | 1.5 | free |
| | (Solid) | — | — | — | — | — | — | — | | | | | |
| 2 | 1580 | Al 0.1% | 20 | 5 | MC + M₆C | dispersed in matrix | 80 | free | 84.0 | 10182 Ton (5.83) | 0.4 mm/ time (0.33) | 0.7 | free |
| | (Solid) | — | — | — | — | — | — | — | | | | | |
| 3 | 1570 | Ti 0.05% | 40 | 8 | MC + M₆C | dispersed in matrix | 40 | free | 85.0 | 10532 Ton (6.03) | 0.4 mm/ time (0.33) | 0.4 | free |
| | (Solid) | — | — | — | — | — | — | — | | | | | |
| Comp. Ex. | | | | | | | | | | | | | |
| 1 | 1310 | Ca—Si 0.15% | 3 | — | Fe₃C | — | 230 | — | 79.5 | 1746 Ton (1.00) | 1.2 mm/ time (1.00) | 2.8 | free |
| | 1340 | — | — | — | — | — | — | — | | | | | |
| 2 | 1375 | free | 5 | — | M₇C₃ | — | 200 | — | 74.5 | 2734 Ton (1.57) | 1.8 mm/ time (1.50) | 2.5 | free |
| | 1350 | — | — | — | — | — | — | — | | | | | |
| 3 | 1550 | free 0.1% | 2.5 | 5 | MC + M₆C | segregated in grain boundary | 180 | free | 85.0 | 6192 Ton (3.55) | 1.5 mm/ time (1.25) | 2.0 | free |
| | (Solid) | — | — | — | — | — | — | — | | | | | |
| 4 | — | — | — | — | MC | — | 25 | — | 82.5 | — | — | 0.2 | occurred |
| 5 | — | — | — | — | M₇C₃ | — | 5 | — | 73.0 | — | — | 0.1 | occurred |

The composite rolls of the present invention were excellent in the manufacturing quality as well as in the service quality.

Specifically, the wear resistance of the composite rolls comprising chemical ingredients falling within the scope of the present invention was 5 times or more that of the conventional rolls. Further, the composite rolls of the present invention had a small surface roughness after use and an improved surface roughening resistance.

In Examples 1, 2 and 3 of the present invention, the crystal grain diameters were 150 μm, 80 μm and 50 μm, respectively, and the surface roughnesses, Ra, after use were 1.6 μm, 0.9 μm and 0.5 μm respectively. The results became better with a reduction in the crystal grain diameter. The composite rolls of Comparative Examples 4 and 5 were produced by powder metallurgy. In these composite rolls, since the structure is excessively fine, the surface roughness after use was so small that slippage occurred between the roll and the rolled product during rolling. As a result, these comparative composite rolls were unsuitable for use.

INDUSTRIAL APPLICABILITY

The application of the present invention to a roll for hot rolling makes it possible to provide a high-quality roll having a good wear resistance and free from the occurrence of crack or the like derived from lack of the toughness. In particular, with respect to the surface roughening resistance, it was confirmed that the roll of the present invention is much superior in the performance to the conventional rolls, which renders the roll of the present invention very useful from the viewpoint of industry.

We claim:

1. A composite roll for rolling, comprising a core material having an outer periphery welded to the inner periphery of an outer layer portion, characterized in that said outer layer portion comprises a steel comprised of, in terms of % by weight, 1.5 to 2.4% of C, 3 to 6% of V and 10 to 22% of total sum of three elements of Cr, Mo and W, with the balance comprising Fe and unavoidable impurities, said outer layer portion comprising a metallic structure which has a crystal grain diameter of 30 to 150 $\mu$m and is surrounded by a eutectic carbide of $M_6C$ type crystallized in a boundary of the crystal grain, and which has a primary crystal carbide of MC type in the grain.

2. A composite roll according to claim 1, wherein at least one of 0.05 to 0.20% of Al and 0.02 to 0.10% of Ti is added as an inoculation material to chemical constituents of said steel and a carbide as a primary crystal is crystallized within a crystal grain constituting the structure of said outer layer portion with an oxide formed in a molten metal serving as a nucleus.

3. A composite roll according to claim 1 or 2, wherein said outer layer portion further comprises 0.1 to 10% of Co.

4. A composite roll according to claim 1 or 2, wherein said outer layer portion further comprises 5 to 10% of Co.

5. A process for producing a composite roll, characterized by comprising pouring a molten metal comprised of, in terms of % by weight, 1.5 to 2.4% of C, 3 to 6% of V and 10 to 22% of total sum of three elements of Cr, Mo and W, with the balance comprising Fe and unavoidable impurities into between a refractory frame and a core material, heating the poured molten metal, cooling and solidifying the molten metal by means of a water-cooled mold provided at the lower end of said refractory frame at an average solidification rate of 4 to 50 mm/min to form an outer layer portion and gradually pulling out the peripheral portion integrated with the core material.

6. A process according to claim 5, wherein casting is conducted after at least one of 0.05 to 0.20% of Al and 0.02 to 0.10% of Ti is added as an inoculation material to chemical consistuents of said molten metal.

7. A process according to claim 5 or 6, wherein said molten metal further comprises 0.1 to 10% of Co.

8. A process according to claim 5 or 6, wherein a high-frequency current having a frequency of 5 kHz or more is supplied to a heating coil provided on the outer periphery of said refractory frame to heat the molten metal.

* * * * *